United States Patent
Ting

(10) Patent No.: US 10,832,027 B2
(45) Date of Patent: Nov. 10, 2020

(54) FINGERPRINT IDENTIFICATION MODULE PACKING METHOD

(71) Applicant: Primax Electronics Ltd., Taipei (TW)

(72) Inventor: Kuan-Pao Ting, Taipei (TW)

(73) Assignee: PRIMAX ELECTRONICS LTD, Taipei (TW)

( * ) Notice: Subject to any disclaimer, the term of this patent is extended or adjusted under 35 U.S.C. 154(b) by 346 days.

(21) Appl. No.: 15/961,566

(22) Filed: Apr. 24, 2018

(65) Prior Publication Data
US 2019/0236328 A1 Aug. 1, 2019

(30) Foreign Application Priority Data
Jan. 26, 2018 (TW) .............................. 107102961 A

(51) Int. Cl.
G06K 9/00 (2006.01)
C09J 5/00 (2006.01)
B23K 26/24 (2014.01)
B23K 101/36 (2006.01)

(52) U.S. Cl.
CPC .......... G06K 9/00013 (2013.01); B23K 26/24 (2013.01); C09J 5/00 (2013.01); B23K 2101/36 (2018.08)

(58) Field of Classification Search
CPC ....... G06K 9/00013; C09J 5/00; B23K 26/24; B23K 2101/36; B23K 2201/36
See application file for complete search history.

(56) References Cited

U.S. PATENT DOCUMENTS

| | | | |
|---|---|---|---|
| 9,252,064 B2 * | 2/2016 | Tsai | H01L 23/3114 |
| 2016/0035613 A1 * | 2/2016 | Yutuc | H01L 21/561 |
| | | | 269/21 |
| 2016/0335470 A1 * | 11/2016 | Park | G06K 9/00013 |
| 2018/0039814 A1 * | 2/2018 | Hsu | H01L 24/00 |
| 2018/0138103 A1 * | 5/2018 | Lu | H01L 23/492 |
| 2018/0150672 A1 * | 5/2018 | Hsu | H04L 63/0861 |

* cited by examiner

*Primary Examiner* — Peter Dungba Vo
*Assistant Examiner* — Phuong Thai
(74) *Attorney, Agent, or Firm* — Kirton McConkie; Evan R. Witt

(57) ABSTRACT

A fingerprint identification module packing method is provided. Firstly, plural fingerprint identification modules are attached on a supporting plate. Then, plural covering plates are attached on fingerprint sensing chips of the fingerprint identification modules. Then, the fingerprint identification modules are transferred to vacuum adsorption holes of a vacuum adsorption fixture. Then, the fingerprint sensing chips, the corresponding covering plates and corresponding metal terminals are welded by a laser welding process. Afterwards, the vacuum adsorption fixture is disabled. Consequently, the plural fingerprint identification modules are transferred to the packing plate.

6 Claims, 10 Drawing Sheets

FINGERPRINT IDENTIFICATION MODULE PACKING METHOD

FIELD OF THE INVENTION

The present invention relates to a field of a biometric identification device, and more particularly to a fingerprint identification module packing method.

BACKGROUND OF THE INVENTION

Recently, a fingerprint identification module has gradually become an essential component of an electronic device. The fingerprint identification module is used to recognize the identity of the user. Consequently, the user can unlock the electronic device or operate an application program through the fingerprint identification module.

Conventionally, after plural fingerprint identification modules are assembled in the fabrication process, the fingerprint identification modules have to be successively removed from a supporting plate. Then, the fingerprint identification modules are successively placed on a packing plate so as to be packed. Since the packing process is complicated, the process of packing the fingerprint identification module is labor-intensive and time-consuming.

For solving the drawbacks of the conventional technologies, there is a need of providing an improved fingerprint identification module packing method for effectively reducing the labor cost and the time cost in the packing process.

SUMMARY OF THE INVENTION

The present invention provides a fingerprint identification module packing method for simultaneously packing a great number of fingerprint identification modules so as to reduce the labor cost and the time cost in the packing process.

In accordance with an aspect of the present invention, there is provided a fingerprint identification module packing method for packing plural fingerprint identification modules. The plural fingerprint identification modules include respective fingerprint sensing chips, respective circuit boards and respective metal terminals. The fingerprint identification module packing method includes the following steps. In a step (a), the plural fingerprint identification modules are attached on a surface of a supporting plate. In a step (b), plural covering plates are attached on the corresponding fingerprint sensing chips. In a step (c), a recess of a vacuum adsorption fixture is covered by the surface of the supporting plate, so that the plural fingerprint identification modules are placed into corresponding vacuum adsorption holes in the recess. In a step (d), the vacuum adsorption fixture is enabled. Consequently, the vacuum adsorption holes generate a vacuum adsorption force to fix the plural fingerprint identification modules in the vacuum adsorption holes. In a step (e), the supporting plate is removed. In a step (f), colloid and conductive paste are filled in spaces between the fingerprint sensing chips and the corresponding covering plates. In a step (g), a welding protection layer is placed in the recess. In a step (h), the fingerprint sensing chips, the corresponding covering plates and the corresponding metal terminals of the fingerprint identification modules are welded. In a step (i), the welding protection layer is removed. In a step (j), the vacuum adsorption fixture is covered by a packing plate, and the vacuum adsorption fixture is turned over. In a step (k), the vacuum adsorption fixture is disabled to stop generating the vacuum adsorption force, so that the plural fingerprint identification modules are transferred to the packing plate.

Preferably, in the step (a), the supporting plate includes an adhesive layer and a frame. The adhesive layer is supported by the frame, and the plural fingerprint identification modules are adhered on the adhesive layer.

Preferably, when the vacuum adsorption fixture is enabled in the step (d), the vacuum adsorption holes are in a negative pressure state, so that the vacuum adsorption force is generated.

Preferably, in the step (g), the welding protection layer is a sheet-type structure comprising plural first openings and plural second openings. The plural first openings are aligned with the corresponding fingerprint sensing chips. The plural second openings are aligned with the corresponding metal terminals.

Preferably, when the welding protection layer is placed in the recess in the step (g), the fingerprint sensing chips are exposed outside the corresponding first openings and the metal terminals are exposed outside the corresponding second openings.

Preferably, in the step (j), the packing plate comprises plural receiving structures corresponding to the plural fingerprint identification modules.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
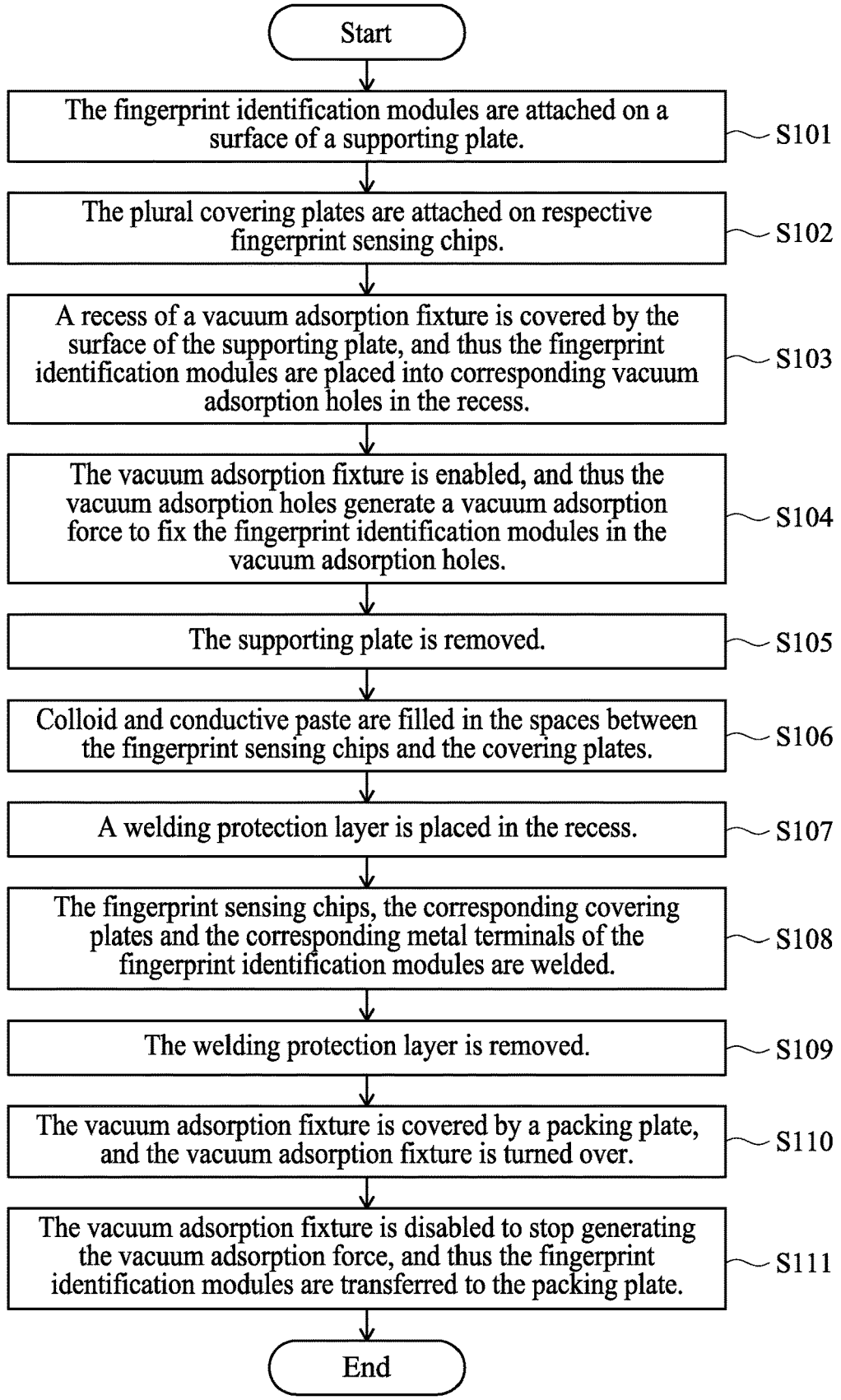
FIG. 1 is a flowchart of a fingerprint identification module packing method according to an embodiment of the present invention.

Please refer to FIG. 1 and FIGS. 2 to 7. FIG. 1 is a flowchart of a fingerprint identification module packing method according to an embodiment of the present invention. FIGS. 2 to 7 schematically illustrate the steps of the fingerprint identification module packing method according to the embodiment of the present invention.

Figure 2:
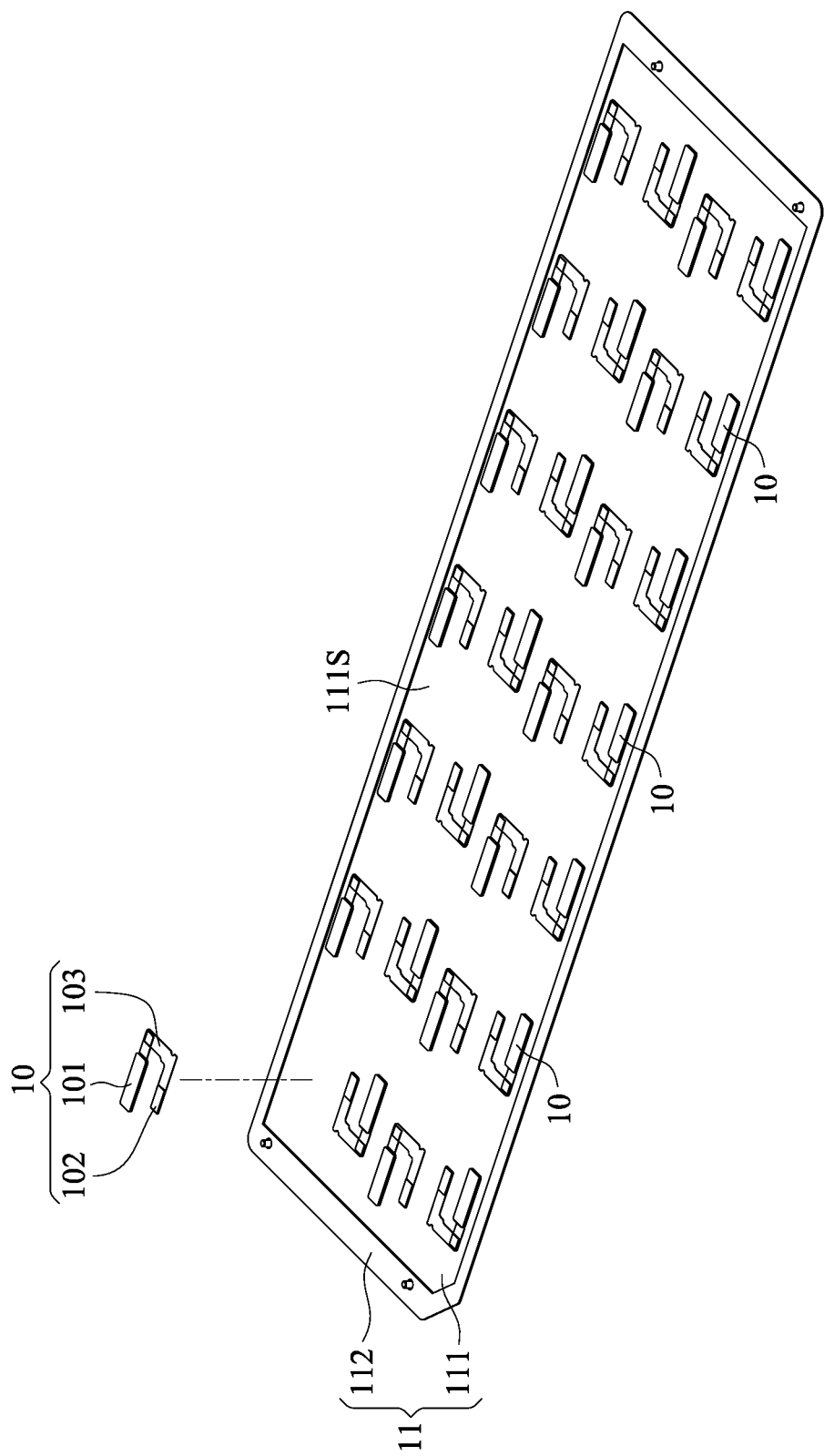
FIGS. 2 to 7 schematically illustrate the steps of the fingerprint identification module packing method according to the embodiment of the present invention.

Please refer to FIGS. 1 and 2. The fingerprint identification module packing method as shown in FIG. 1 is suitable for packing plural fingerprint identification modules 10. Each fingerprint identification module 10 comprises a circuit board 103, a fingerprint sensing chip 101 and a metal terminal 102. The fingerprint sensing chip 101 and the metal terminal 102 are disposed on the circuit board 103 (see FIG. 2). Firstly, the fingerprint identification modules 10 are attached on a surface 111S of a supporting plate 11 (Step S101). In the step S101, the supporting plate 11 comprises an adhesive layer 111 and a frame 112. The frame 112 is arranged around the adhesive layer 111 for supporting the adhesive layer 111. The fingerprint identification modules 10 are adhered on the surface 111S of the adhesive layer 111. Particularly, the fingerprint identification modules 10 are temporarily adhered and fixed on the surface 111S of the adhesive layer 111. After the fingerprint identification modules 10 are temporarily adhered and fixed on the surface 111S of the adhesive layer 111, a plasma cleaning process is performed to clean the surfaces of the fingerprint identification modules 10. Preferably, the adhesive layer 111 is an adhesive paper that is capable of withstanding high temperature. Even if the adhesive layer 111 is in a high temperature environment, the adhesive layer 111 has sufficient stickiness to continuously fixing the fingerprint identification modules 10.

Figure 3:
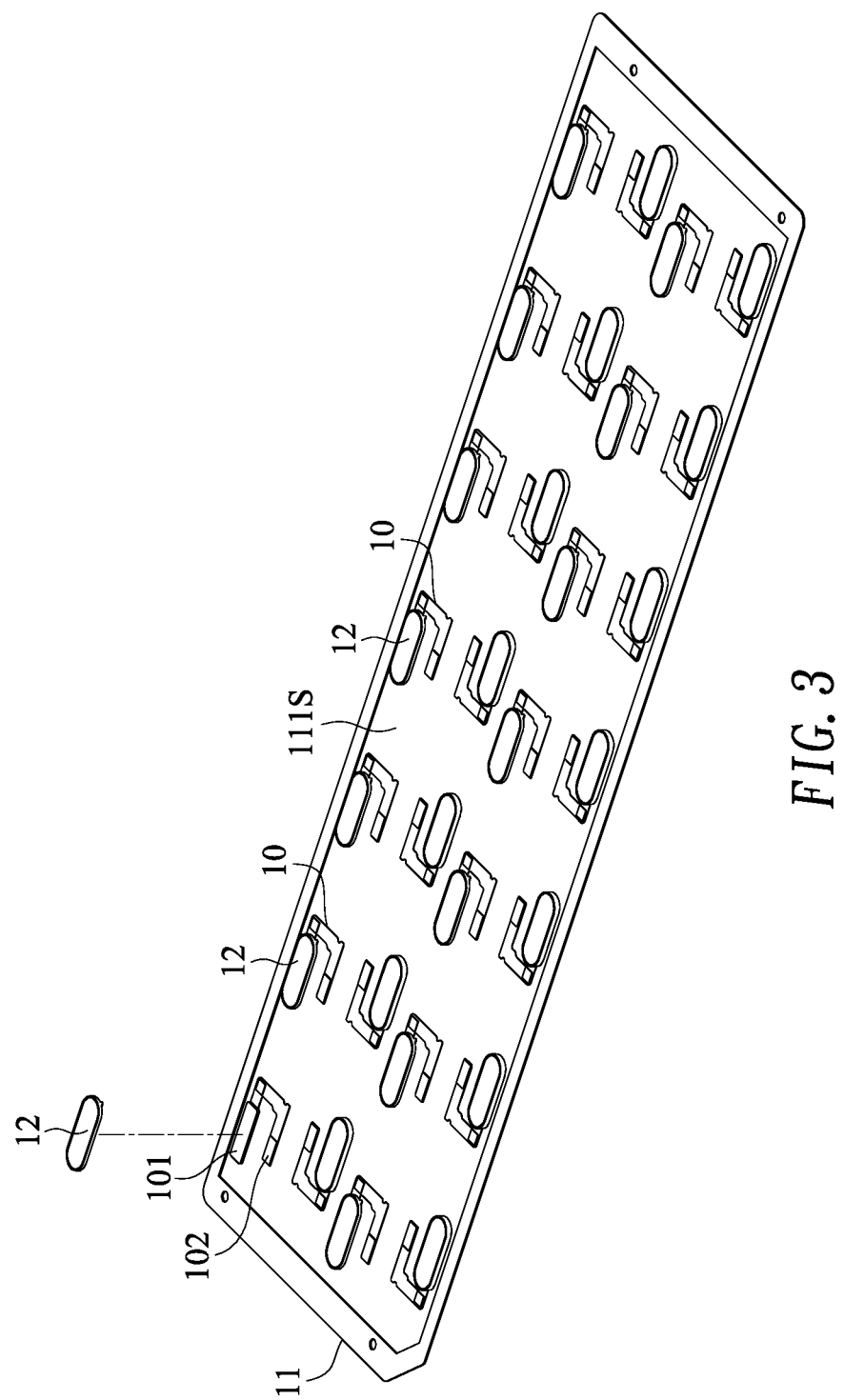

Please refer to FIGS. 1 and 3. After the fingerprint identification modules 10 are temporarily adhered and fixed on the surface 111S of the adhesive layer 111, plural covering plates 12 are attached on the top surfaces of the respective fingerprint sensing chips 101 (Step S102). In the step S102, a glue layer (not shown) is coated on the corresponding fingerprint sensing chip 101, and the covering plate 12 is placed over the fingerprint sensing chip 101 to cover the fingerprint sensing chip 101. Consequently, the covering plate 12 and the fingerprint sensing chip 101 are combined together through the glue layer on the fingerprint sensing chip 101. Because the covering plate 12 is slightly larger than the fingerprint sensing chip 101, spaces or gaps are formed below the covering plate around the outer perimeter of the fingerprint sensing chip 101. After the covering plates 12 and the corresponding fingerprint sensing chips 101 are combined together through the corresponding glue layers, the fingerprint identification modules 10 and the supporting plate 11 are placed in a high temperature and high pressure environment. Then a de-bubbling process is performed on the glue layers between the covering plates 12 and the corresponding fingerprint sensing chips 101. Consequently, bubbles are removed from the glue layers. In an embodiment, the covering plate 12 comprises a ceramic plate and a bezel (not shown). The ceramic plate and the bezel are attached on each other through a double-sided tape.

Figure 4A:
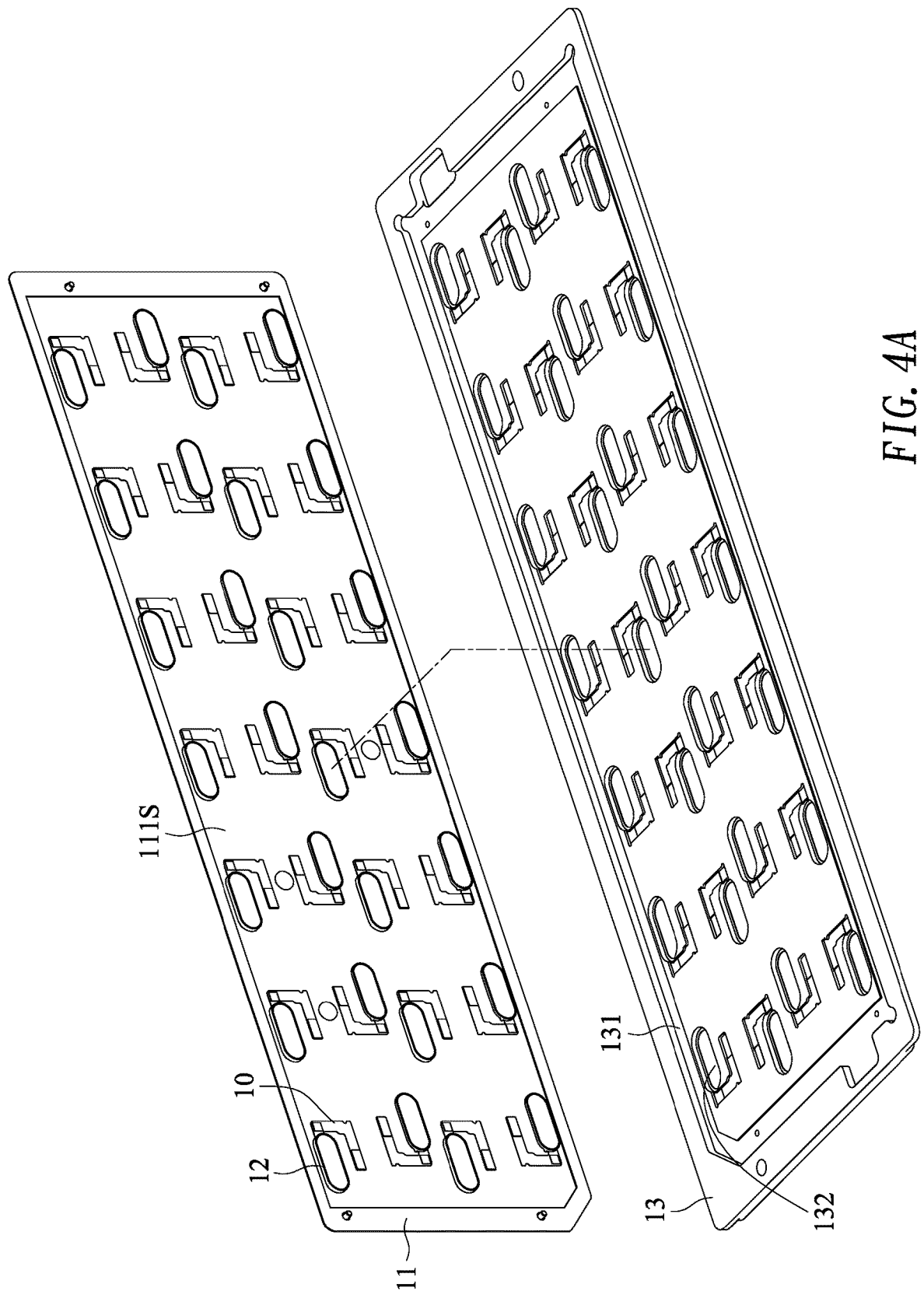
Figure 4B:
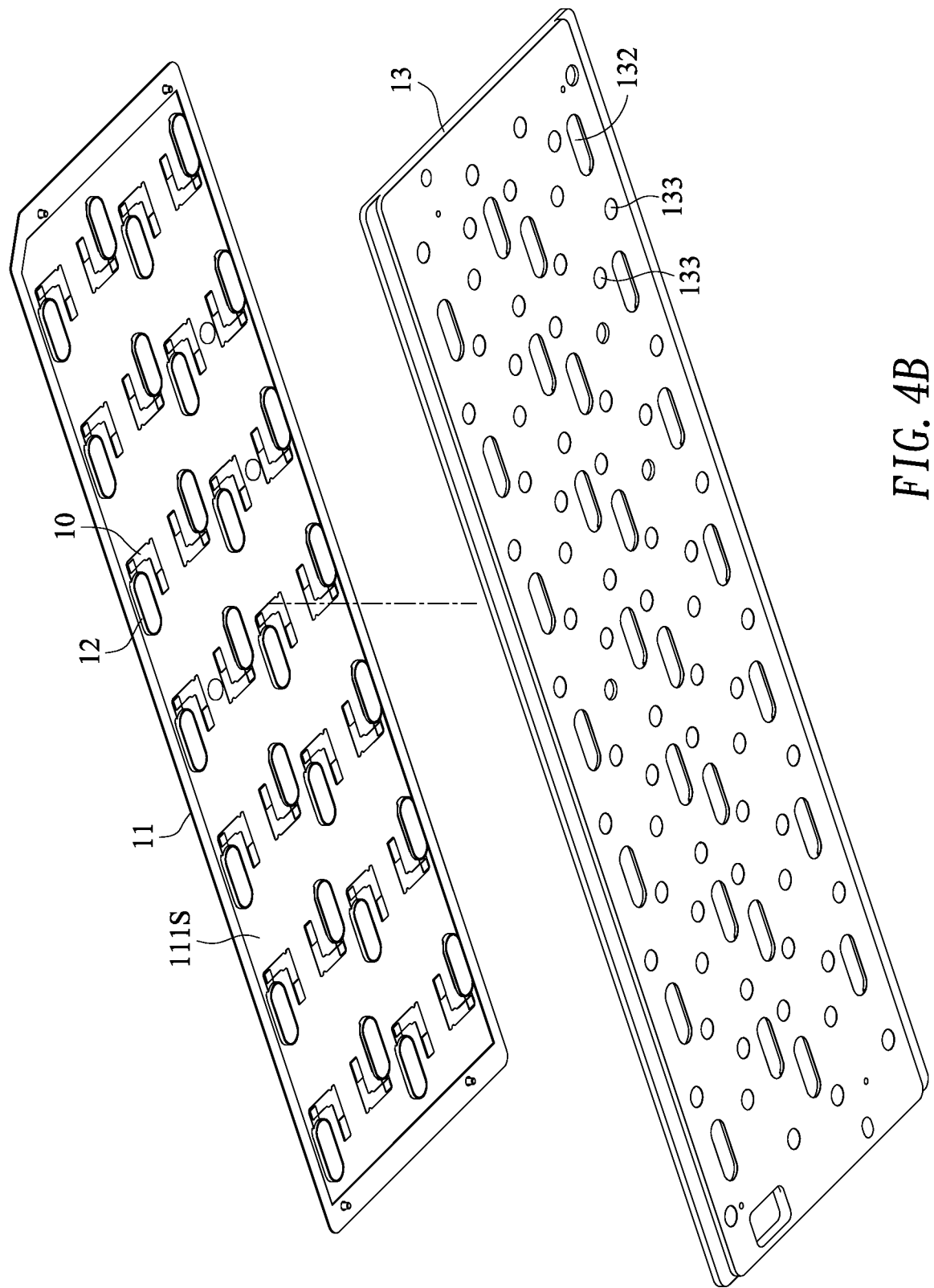

Please refer to FIGS. 1, 4A and 4B. After the covering plate 12 and the fingerprint sensing chip 101 are combined together, the surface 111S of the supporting plate 11 covers a recess 131 of a vacuum adsorption fixture 13. Consequently, the fingerprint identification modules 10 are placed into corresponding vacuum adsorption holes 132 that are formed in the recess 131 (Step S103). In the step S103, the recess 131 is formed in a first surface of the vacuum adsorption fixture 13. The vacuum adsorption holes 132 are formed in the bottom side of the recess 131 (see FIG. 4A). The shape of the recess 131 matches the shape of the frame 112. Consequently, the supporting plate 11 covers the recess 131 of a vacuum adsorption fixture 13 can be completely accommodated within the recess 131. The shapes of the vacuum adsorption holes 132 match the shapes of the fingerprint identification modules 10 and the shapes of the covering plates 12. Consequently, the fingerprint identification modules 10 and the covering plates 12 can be completely accommodated within the corresponding vacuum adsorption holes 132. When the vacuum adsorption fixture 13 is enabled, the vacuum adsorption holes 132 are in a negative pressure state. Consequently, a vacuum adsorption force is generated. Moreover, as shown in FIG. 4B, plural magnetic elements 133 are disposed on a second surface of the vacuum adsorption fixture 13. The first surface and the second surface of the vacuum adsorption fixture 13 are opposed to each other. The magnetic elements 133 are used for providing the magnetic attraction function.

Figure 5A:
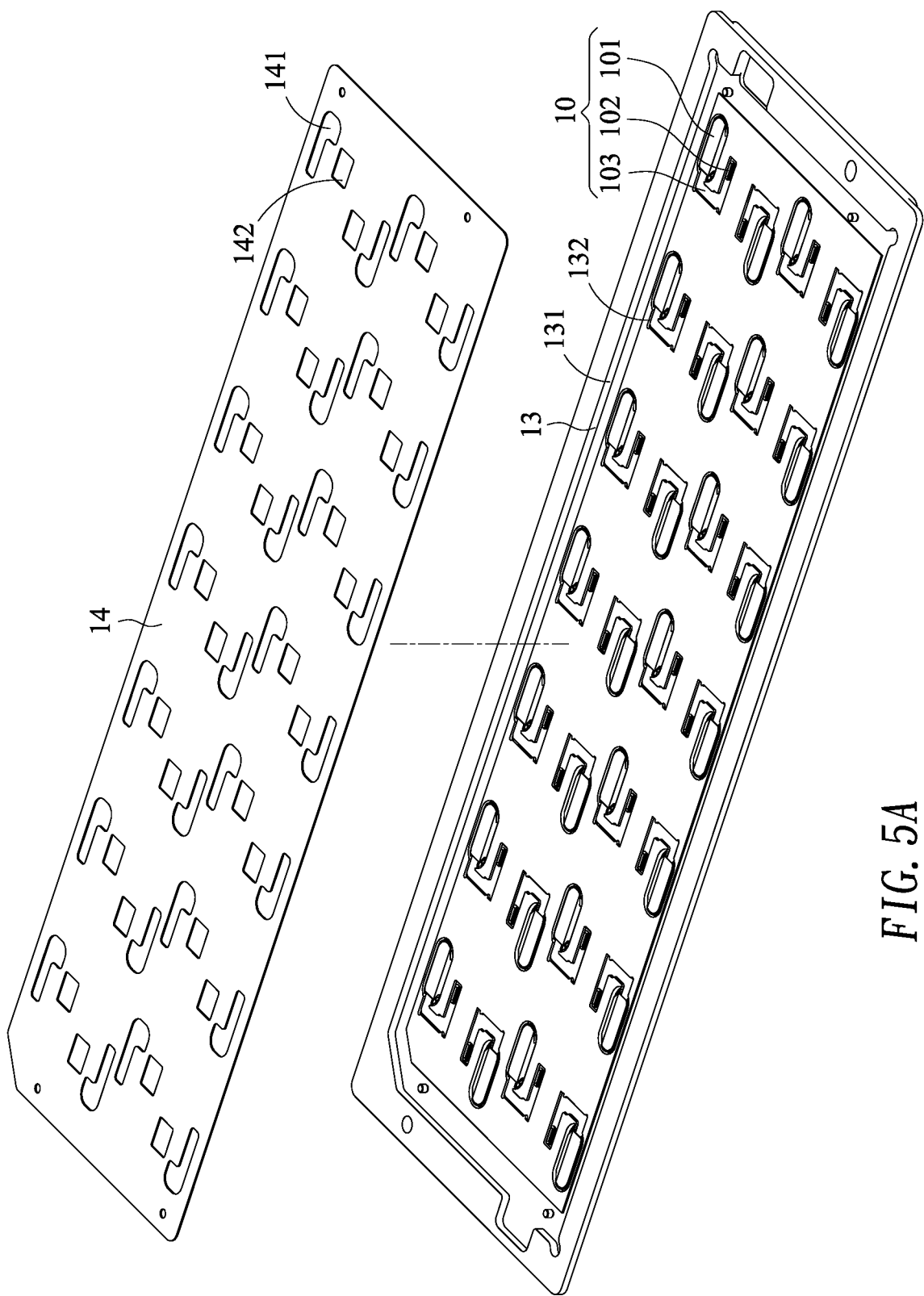
Figure 5B:
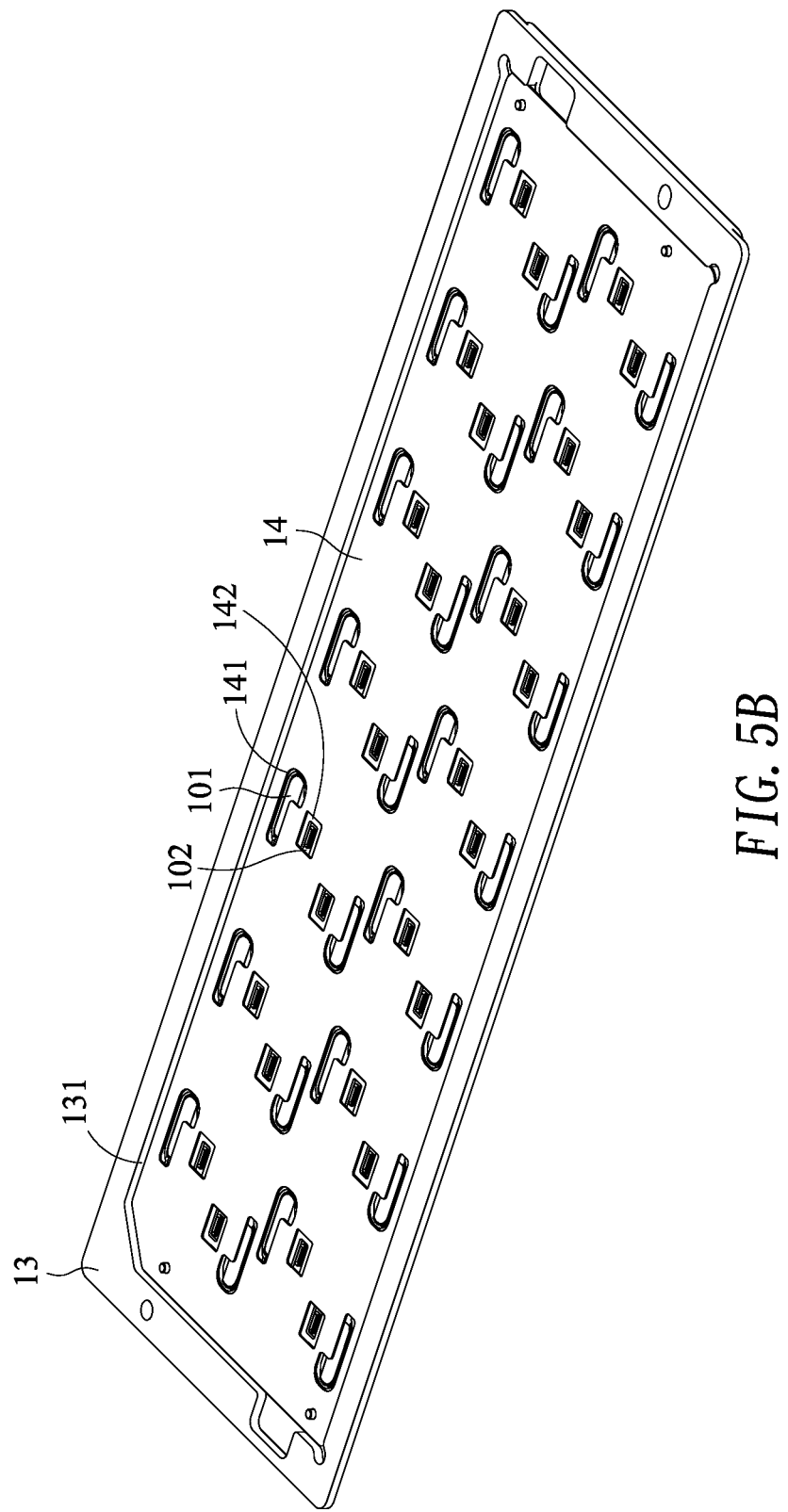
Figure 6A:
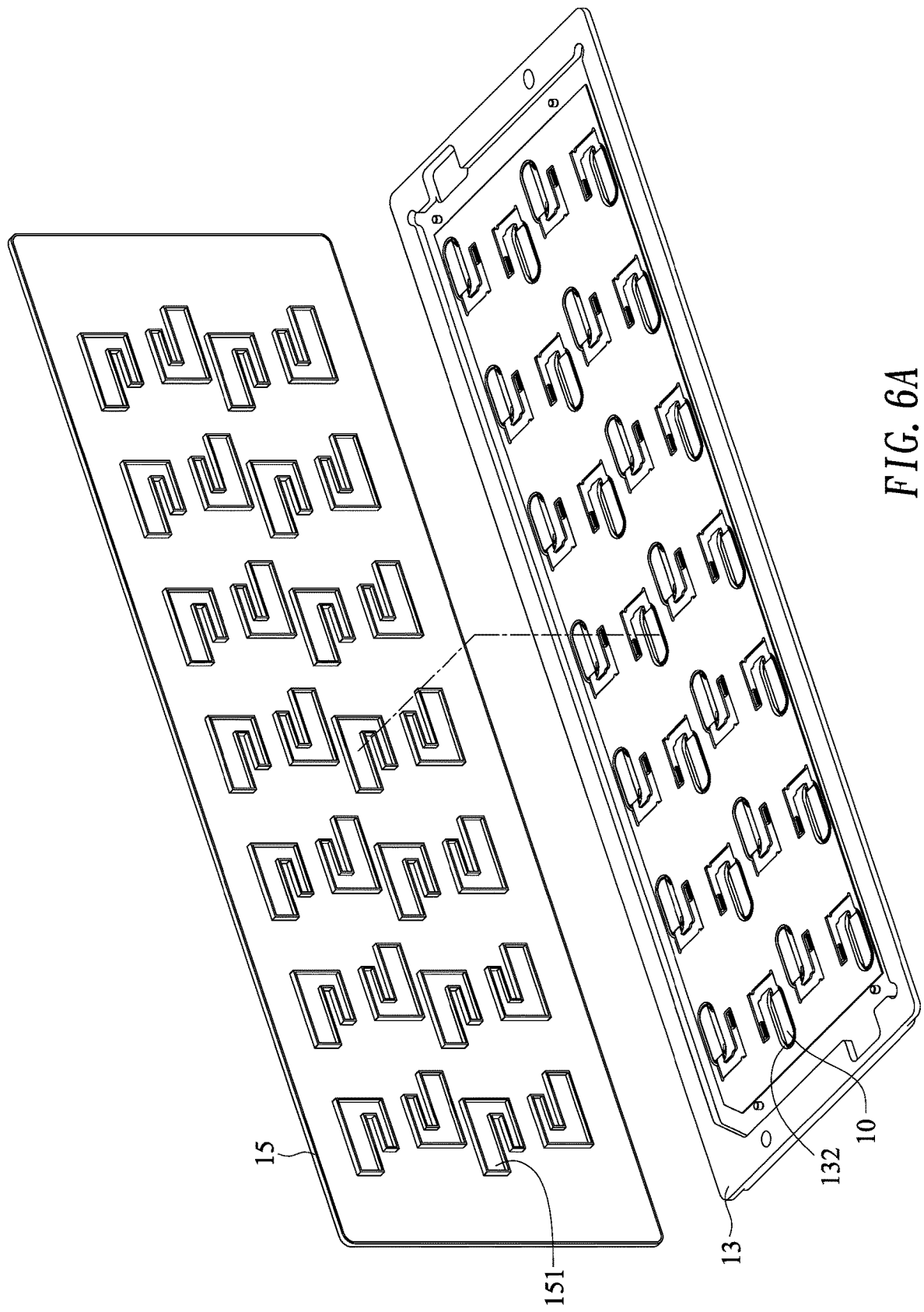
Figure 6B:
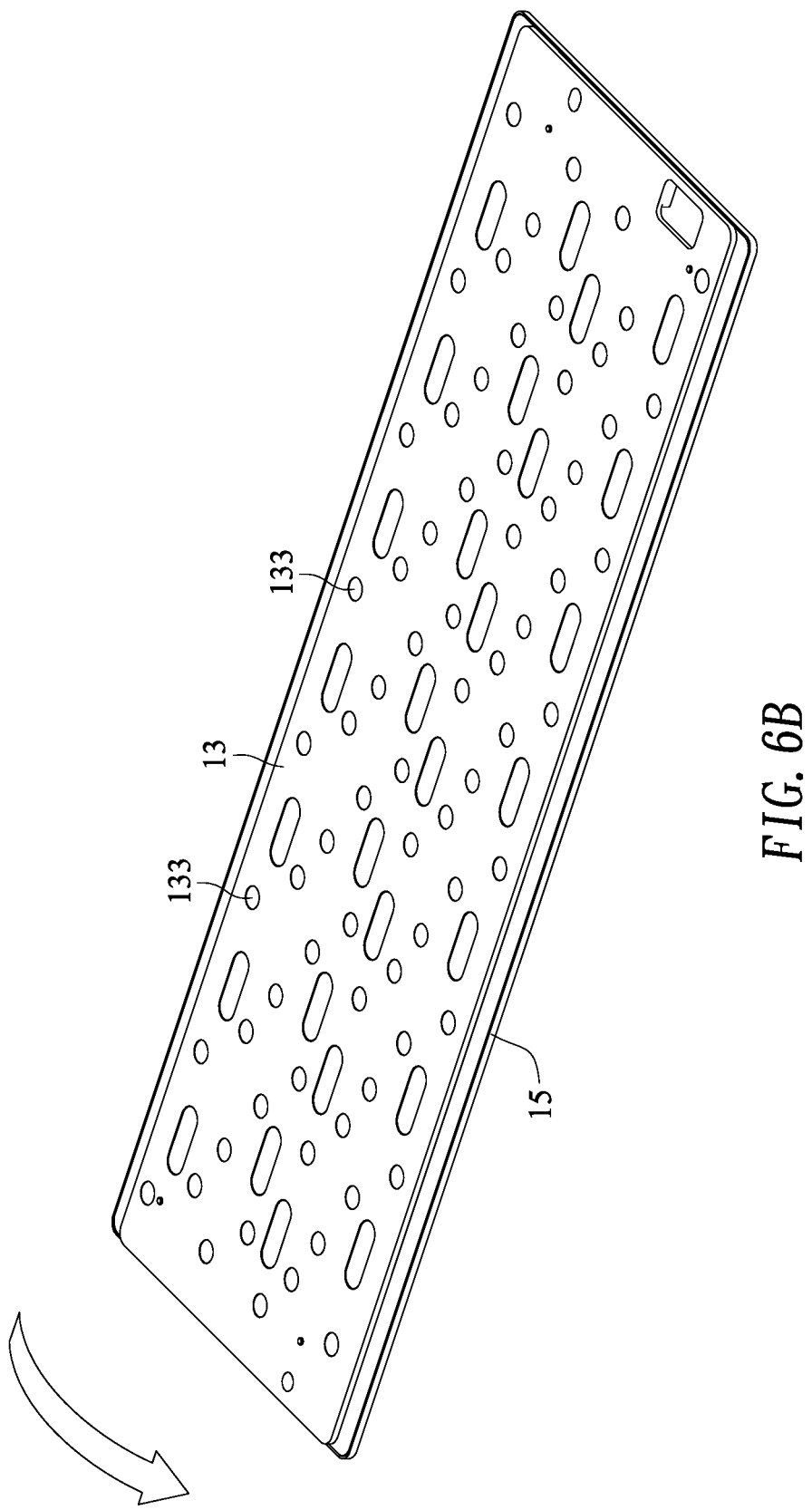
Figure 7:
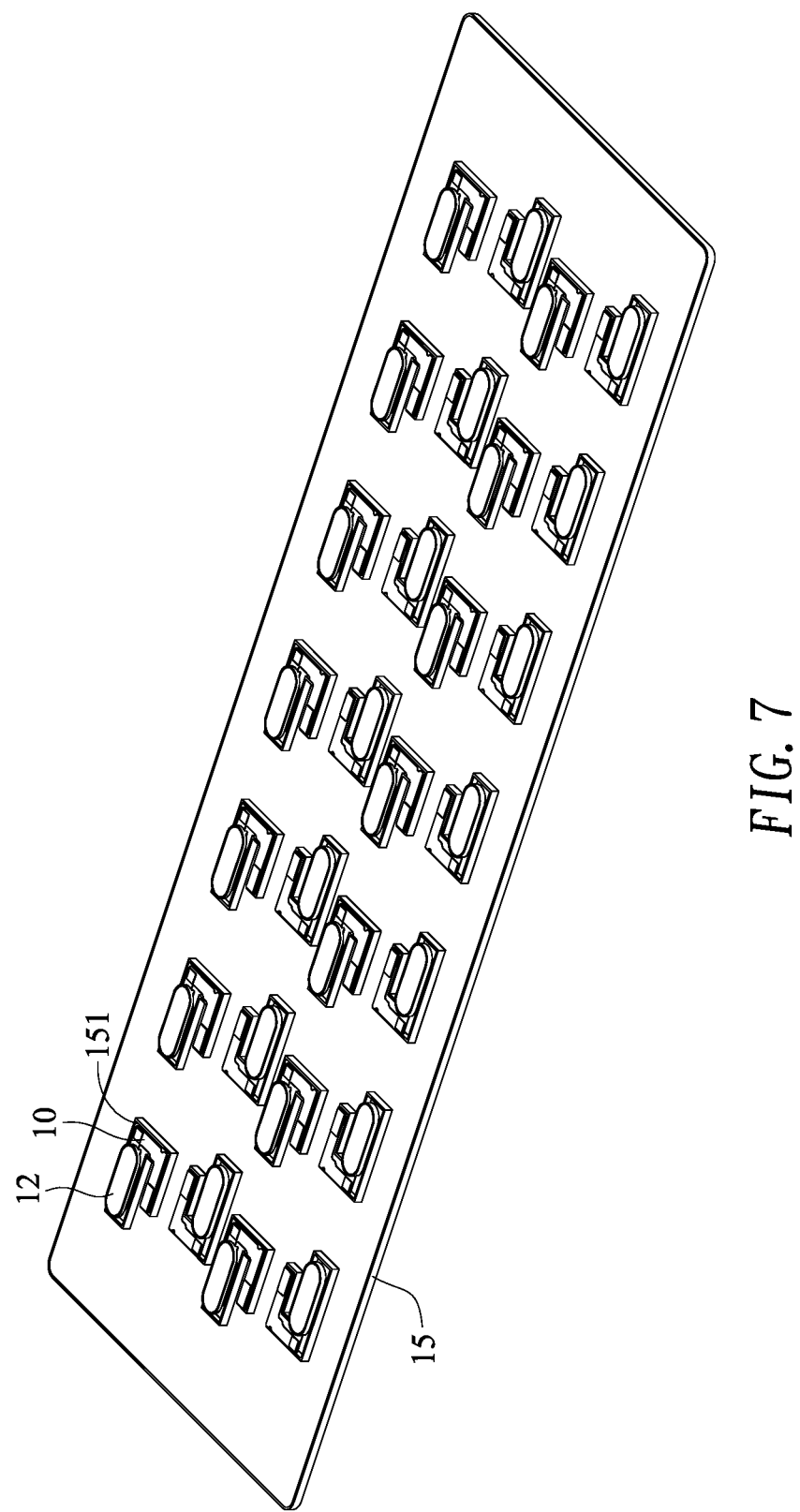

Please refer to FIGS. 1, 5A and 5B. After the fingerprint identification modules 10 and the covering plates 12 attached on the fingerprint identification modules 10 are placed into the corresponding vacuum adsorption holes 132, the vacuum adsorption fixture 13 is enabled. Consequently, the vacuum adsorption holes 132 generate the vacuum adsorption force. In response to the vacuum adsorption force, the fingerprint identification modules 10 are fixed in the vacuum adsorption holes 132 (Step S104). In the step S104, the vacuum adsorption holes 132 are in the negative pressure state when the vacuum adsorption fixture 13 is enabled. Consequently, the fingerprint identification modules 10 and the covering plates 12 in the vacuum adsorption holes 132 can be adsorbed and fixed in the vacuum adsorption holes 132. Then, the supporting plate 11 is removed (Step S105). As mentioned above, the fingerprint identification modules 10 are temporarily adhered and fixed on the surface 111S of the adhesive layer 111. After the negative pressure is generated in the vacuum adsorption holes 132 and the fingerprint identification modules 10 and the covering plates 12 are adsorbed and fixed in the vacuum adsorption holes 132, the supporting plate 11 can be removed from the recess 131 in the step S105. Meanwhile, the fingerprint identification modules 10 and the covering plates 12 are transferred from the surface 111S of the adhesive layer 111 of the supporting plate 11 to the vacuum adsorption holes 132.

Then, colloid and conductive paste are filled in the outer perimeter spaces between the fingerprint sensing chips 101 and the covering plates 12 (Step S106). In the step S106, the colloid and the conductive paste are filled in the spaces between the fingerprint sensing chips 101 and the covering plates 12 through a dispensing device (not shown). Then, a welding protection layer 14 is placed in the recess 131 (Step S107). In step S107, the portions of the fingerprint identification modules 10 that need not be welded in the subsequent laser welding process are protected by the welding protection layer 14. In an embodiment, the welding protection layer 14 is sheet-type structure. Moreover, the welding protection layer 14 comprises plural first openings 141 and plural second openings 142. The plural first openings 141 are aligned with the corresponding fingerprint sensing chips 101. The plural second openings 142 are aligned with the corresponding metal terminals 102 (see FIG. 5A). Moreover, the shape of the welding protection layer 14 matches the shape of the recess 131. Consequently, when the welding protection layer 14 is placed in the recess 131, the recess 131 is completely covered by the welding protection layer 14. In addition, the fingerprint sensing chips 101 of the fingerprint identification modules 10 and the covering plates 12 are exposed outside the first openings 141, and the metal terminals 102 are exposed outside the second openings 142 (see FIG. 5B). Then, the fingerprint sensing chips 101, the corresponding covering plates 12 and the corresponding metal terminals 102 of the fingerprint identification modules 10 are welded (Step S108). In the step S108, the fingerprint sensing chips 101, the covering plates 12 and the metal terminals 102 of the fingerprint identification modules 10 are welded by a laser device (not shown) according to a spot welding technology. Consequently, the fingerprint sensing chips 101 and the corresponding covering plates 12 are in close contact with each other, and the metal terminals 102 are securely connected with the corresponding circuit boards 103. Since the portions of the fingerprint identification modules 10 that need not be welded have been covered by the welding protection layer 14, the components of the fingerprint identification modules 10 that need not be welded will not be damaged during the spot welding process of the laser device. Optionally, after the welding process is completed, a baking process is performed. Consequently, the adhesion between the fingerprint sensing chips 101 and the corresponding covering plates 12 is enhanced.

Please refer to FIGS. 1, 6A, 6B and 7. After the welding process is completed, the welding protection layer 14 is removed (Step S109). Then, the vacuum adsorption fixture 13 is covered by a packing plate 15 and the vacuum adsorption fixture 13 is turned over (Step S110). In the step S110, the packing plate 15 is made of a metallic material. As mentioned above, plural magnetic elements 133 are disposed on the second surface of the vacuum adsorption fixture 13. Consequently, the packing plate 15 is magnetically attracted by the magnetic elements 133. That is, the packing plate 15 is temporarily fixed on the vacuum adsorption fixture 13. Consequently, while the vacuum adsorption fixture 13 is turned over, the packing plate 15 is not shifted or detached (see FIG. 6B). Moreover, the packing plate 15 comprises plural receiving structures 151 for receiving the corresponding fingerprint identification modules 10. Afterwards, the vacuum adsorption fixture 13 is disabled to stop generating the vacuum adsorption force, and thus the fingerprint identification modules 10 are transferred to the packing plate 15 (Step S111). In the step S111, the vacuum adsorption holes 132 stop having the negative pressure when the vacuum adsorption fixture 13 is disabled. Since the vacuum adsorption force is eliminated, the fingerprint identification modules 10 are removed from the vacuum adsorption holes 132 and accurately placed in the corresponding receiving structures 151 of the packing plate 15. By using the packing method of the present invention, the worker does not need to successively place the fingerprint identification modules in the packing plate. Consequently, the labor cost and the time cost in the packing process of packing the fingerprint identification modules are reduced.

When compared with the conventional technologies, the fingerprint identification module packing method of the present invention is capable of simultaneously packing a great number of fingerprint identification modules so as to reduce the labor cost and the time cost in the packing process. In other words, the fingerprint identification module packing method of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A fingerprint identification module packing method for packing plural fingerprint identification modules, the plural fingerprint identification modules comprising respective fingerprint sensing chips, respective circuit boards and respective metal terminals, the fingerprint identification module packing method comprising steps of:
   (a) attaching the plural fingerprint identification modules on a surface of a supporting plate;
   (b) attaching plural covering plates on the corresponding fingerprint sensing chips;
   (c) allowing the surface of the supporting plate to cover a recess of a vacuum adsorption fixture, so that the plural fingerprint identification modules are placed into corresponding vacuum adsorption holes in the recess;
   (d) enabling the vacuum adsorption fixture, so that the vacuum adsorption holes generate a vacuum adsorption force to fix the plural fingerprint identification modules in the vacuum adsorption holes;
   (e) removing the supporting plate;
   (f) filling colloid and conductive paste in spaces between the fingerprint sensing chips and the corresponding covering plates;
   (g) placing a welding protection layer in the recess;
   (h) welding the fingerprint sensing chips, the corresponding covering plates and the corresponding metal terminals of the fingerprint identification modules;
   (i) removing the welding protection layer;
   (j) allowing a packing plate to cover the vacuum adsorption fixture, and turning over the vacuum adsorption fixture; and
   (k) disabling the vacuum adsorption fixture to stop generating the vacuum adsorption force, so that the plural fingerprint identification modules are transferred to the packing plate.

2. The fingerprint identification module packing method according to claim 1, wherein in the step (a), the supporting plate comprises an adhesive layer and a frame, wherein the adhesive layer is supported by the frame, and the plural fingerprint identification modules are adhered on the adhesive layer.

3. The fingerprint identification module packing method according to claim 1, wherein when the vacuum adsorption fixture is enabled in the step (d), the vacuum adsorption holes are in a negative pressure state, so that the vacuum adsorption force is generated.

4. The fingerprint identification module packing method according to claim 1, wherein in the step (g), the welding protection layer is a sheet-type structure comprising plural first openings and plural second openings, wherein the plural first openings are aligned with the corresponding fingerprint sensing chips, and the plural second openings are aligned with the corresponding metal terminals.

5. The fingerprint identification module packing method according to claim 4, wherein when the welding protection layer is placed in the recess in the step (g), the fingerprint sensing chips are exposed outside the corresponding first openings and the metal terminals are exposed outside the corresponding second openings.

6. The fingerprint identification module packing method according to claim 1, wherein in the step (j), the packing plate comprises plural receiving structures corresponding to the plural fingerprint identification modules.

* * * * *